US011841111B2

(12) United States Patent
Purton

(10) Patent No.: US 11,841,111 B2
(45) Date of Patent: Dec. 12, 2023

(54) VIDEO SCREEN MOUNTING

(71) Applicant: B-Tech International Limited, Northamptonshire (GB)

(72) Inventor: Gary Purton, Northamptonshire (GB)

(73) Assignee: B-Tech International Limited

( * ) Notice: Subject to any disclaimer, the term of this patent is extended or adjusted under 35 U.S.C. 154(b) by 55 days.

(21) Appl. No.: 17/588,521

(22) Filed: Jan. 31, 2022

(65) Prior Publication Data
US 2022/0240676 A1 Aug. 4, 2022

(30) Foreign Application Priority Data
Jan. 29, 2021 (GB) ..................................... 2101314

(51) Int. Cl.
*F16M 13/02* (2006.01)
*A47B 97/00* (2006.01)

(52) U.S. Cl.
CPC .......... *F16M 13/02* (2013.01); *A47B 97/001* (2013.01); *F16M 2200/061* (2013.01)

(58) Field of Classification Search
CPC .............. F16M 13/02; F16M 2200/061; A47B 97/001; G09F 9/3026
See application file for complete search history.

(56) References Cited

U.S. PATENT DOCUMENTS

| 7,731,143 | B2 | 6/2010 | Muday | |
| D625,300 | S | * 10/2010 | Stifal | ..................... F16M 13/02 |
| | | | | D14/239 |

(Continued)

FOREIGN PATENT DOCUMENTS

| CN | 109611673 | 4/2019 |
| CN | 209524289 | 10/2019 |

(Continued)

OTHER PUBLICATIONS

Extended Search Report dated Jun. 17, 2022 issued in connection with European Patent Application No. 22154357.2, ten (10) pages.

(Continued)

*Primary Examiner* — Eret C McNichols
(74) *Attorney, Agent, or Firm* — Merek, Blackmon & Voorhees, LLC

(57) ABSTRACT

A mounting apparatus (1) to mount a flat video screen, forming part of a video wall, to a support comprises a front frame (2) to carry the video screen, and a rear frame (3) to mount to the support, connected by a pair of scissor mechanisms (6). The mounting apparatus (1) has a closed configuration in which the scissor mechanisms (6) are closed and the front (2) and rear (3) frames are close together, and an open configuration in which the scissor mechanisms (6) are open and the frontal frame (2) is spaced away from the rear frame (3). A tension spring (18) is mounted across one scissor mechanism (6), urging it open and biasing the frames (2,3) apart into the open configuration. A series of latch elements (15,16) mounted to the frontal (2) and rear (3) frames engage when the frames (2,3) are pushed together into the closed configuration, holding the frames (2,3) together, but then release when the frames (2,3) are again pushed together, allowing the tension spring (18) to drive them apart. To avoid too rapid and jerky movement, a damping mechanism (21) is provided to regulate the motion of the scissor mechanisms (6) and the frames (2,3). Thus, the flat video screen on the frontal frame (2) forms part of the video wall when the mounting apparatus (1) is latched closed, but the mounting apparatus (1) is easily unlatched and opens, such that the frontal frame (2) and video screen move smoothly and safely forwards out of the video wall, for maintenance or replacement of the video screen.

20 Claims, 8 Drawing Sheets

(56) References Cited

U.S. PATENT DOCUMENTS

| | | | | |
|---|---|---|---|---|
| 8,523,129 | B2* | 9/2013 | Stifal | F16M 11/10 |
| | | | | 248/299.1 |
| 9,339,113 | B1* | 5/2016 | Cheng | F16M 13/022 |
| 9,546,756 | B1* | 1/2017 | Hung | F16M 13/02 |
| 10,024,490 | B2* | 7/2018 | Lam | F16M 13/02 |
| 10,317,006 | B2* | 6/2019 | Kozlowski, Jr. | F16M 13/02 |
| 10,443,782 | B2* | 10/2019 | Kahn | F16M 11/046 |
| 10,533,702 | B2* | 1/2020 | Kahn | A47B 97/001 |
| 10,746,350 | B2 | 8/2020 | Pei | |
| 2005/0274855 | A1* | 12/2005 | Shin | F16M 11/048 |
| | | | | 248/220.22 |
| 2013/0146727 | A1* | 6/2013 | Oh | F16M 13/02 |
| | | | | 248/277.1 |
| 2020/0208774 | A1 | 7/2020 | Pei | |

FOREIGN PATENT DOCUMENTS

| | | | | |
|---|---|---|---|---|
| GB | 2527739 A * | 1/2016 | | F16M 11/041 |
| GB | 2545941 | 7/2017 | | |
| KR | 101076373 B1 * | 10/2011 | | A47B 97/001 |
| WO | WO-2015168422 A1 * | 11/2015 | | F16M 11/046 |
| WO | WO-2016093715 A1 * | 6/2016 | | A47B 46/005 |
| WO | WO-2017044622 A1 * | 3/2017 | | A47B 97/001 |

OTHER PUBLICATIONS

Search Report dated Jun. 24, 2022 issued in connection with UK Patent Application No. GB2101314.9, one (1) page.
Communication dated Jun. 27, 2022 issued in connection with UK Patent Application No. GB2101314.9, one (1) page.
Machine generated translation of CN109611673.
Machine generated translation of CN209524289.

* cited by examiner

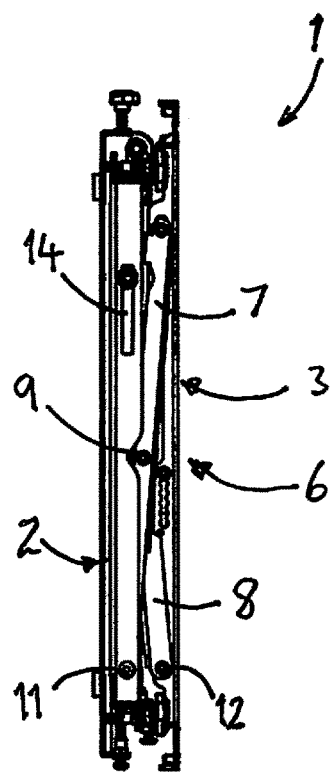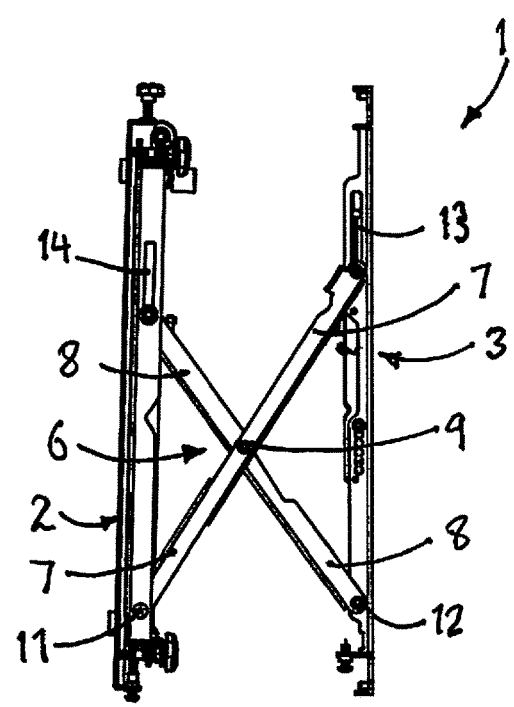
Fig 5A
Fig 5B
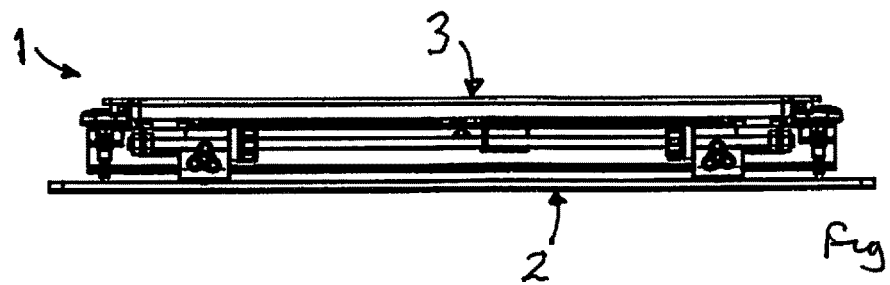
Fig 6A
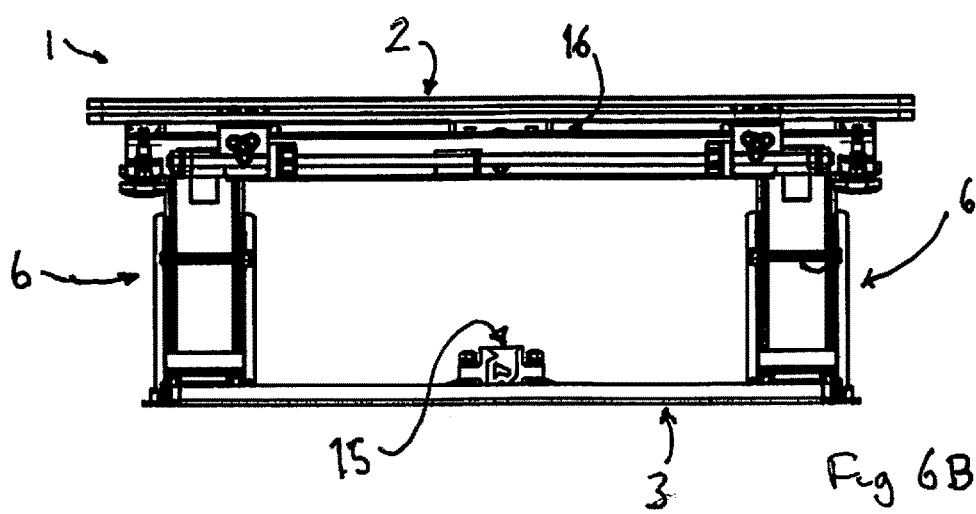
Fig 6B

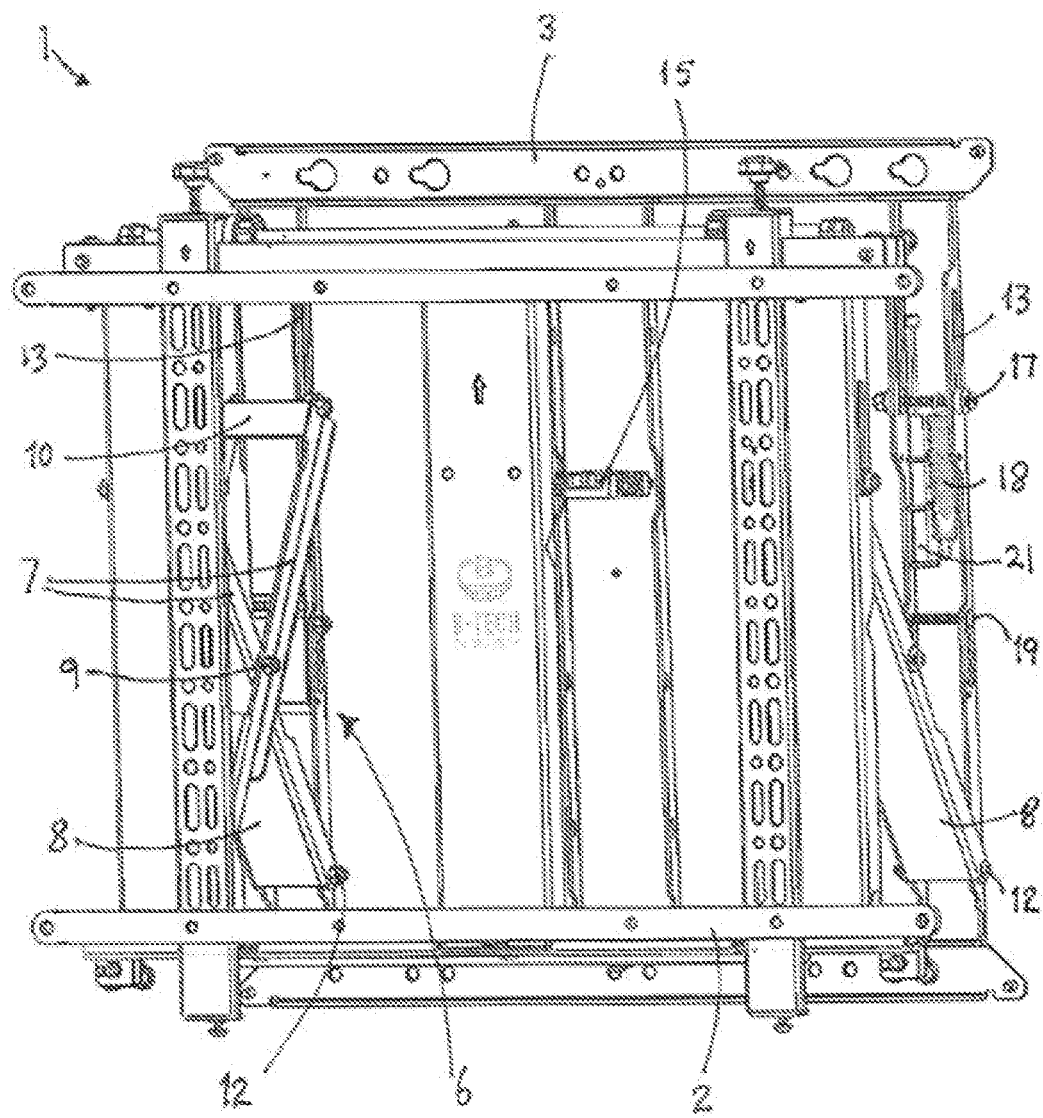

VIDEO SCREEN MOUNTING

RELATED APPLICATION

The subject patent application claims priority from United Kingdom Patent Application No. GB 2101314.9 filed on Jan. 29, 2021. The entire contents of United Kingdom Patent Application No. GB 2101314.9 are incorporated herein by reference.

The present invention relates for apparatus for mounting a flat video screen to a wall or other vertical support surface. More particularly but not exclusively, it relates to such mountings for flat video screens forming portions of video walls, and/or for flat video screens located within recesses.

It is well known to mount multiple flat video screens to a wall or other vertical support to form a "video wall" on which the multiple flat video screens can be used to display a single image as if they were a single large flat screen.

Conventional mountings for flat video screens comprise a first frame which is mountable to a rear face of the video screen, and a second frame which is mountable to a wall using conventional fixtures and fittings. The first and second frames are then mounted together, for domestic single video screens frequently being directly connected to each other, or being connected via a pivotable mounting to allow the video screen to be positioned at a desired angle for optimum visibility for viewers.

In the event of malfunctions of the video screen, it is then easy to reach behind the flat video screen and uncouple the two frames, or remove the flat video screen from its first frame, in order to reach controls or access panels on the rear face of the flat video screen for adjustment, troubleshooting and/or repairs. In the extreme case, a functional flat video screen can simply be substituted for the malfunctioning one.

However, for video walls, this is not possible. So as to appear as a single vast screen, the individual flat video screens must be mounted as close as possible to edge-to-edge, all extending in near enough the same plane, so that a viewer "can't see the join". Thus, at best, only peripheral screens of the video wall could be accessed as described above. A problem with a more centrally-located screen might require a large proportion of the video wall to be dismantled, screen by screen, from an edge inwards, so as to reach the offending screen.

Similar problems arise when, for reasons of space or design, one or more flat video screens are mounted within a recess in a wall, typically with the front, screen face of the video screen flush with the wall surface. For these layouts, the rear of the flat video screen(s) is again inaccessible, should there be any problems.

Attempts have been made to resolve these issues by using mountings in which the respective frames can be displaced generally perpendicularly to the plane of the video wall, extending the offending screen outwardly from the plane of the video wall, or outwardly from the plane of the wall around the recess, respectively. However, these mountings have not proven wholly satisfactory, either their motion being unacceptable, the extension mechanism being too complex and expensive, or frequently both.

It is hence an object of the present invention to provide apparatus for mounting a flat video screen to a support, whether as part of a video wall or the like, or in an inaccessible recess, or both, which obviates the above disadvantages of existing apparatus, particularly by providing controlled relative motion of the screen and its support, on demand, with a simple and reliable mechanism that is relatively straightforward to manufacture, while incurring relatively low cost.

According to a first aspect of the present invention, there is provided apparatus for mounting a flat video screen to a support as part of a video wall, in which a frontal viewing surface of said flat video screen extends flush with a frontal viewing surface of each other flat video screen of the video wall, said apparatus comprising first frame means mountable to a rear surface of the flat video screen opposite its frontal viewing surface, second frame means mountable to a wall or other support, and a selectably extensible connection mechanism linking said first and second frame means, said connection mechanism being selectably reconfigurable between a closed configuration in which the frontal viewing surface extends substantially coplanarly with the frontal viewing surfaces of adjacent flat video screens of the video wall, and an open configuration in which said flat video screen is displaced significantly outwardly from the video wall, wherein:

the connection mechanism comprises one or more scissor mechanisms, with the or each scissor mechanism comprising a first and second strut means, connected pivotably together adjacent a respective mid-point of each said strut means, a lower, in use, end of first strut means being pivotably mounted to the first frame means and a lower, in use, end of the second strut means being pivotably mounted to the second frame means, while an upper, in use, end of the first strut means, remote from said lower, in use, end, is constrained to follow substantially vertical elongate track means of the second frame means, and an upper, in use, end of the second strut means is constrained to follow substantially vertical elongate track means of the first frame means, and:

a biasing element is provided to urge said connection mechanism towards its open configuration, and wherein:

the connecting mechanism is provided with a damping element associated with at least one of the or each scissor mechanism, said damper element being operatively connected either between the upper end of the first or second strut means and the lower end of the second or first strut means respectively, or between said upper end of the first or second strut means and a fixed point on the second or first frame means respectively.

Thus, in the closed configuration of the connection mechanism, the upper end of each strut means is disposed adjacent an upper end of a respective track means, and the first and second frame means extend adjacently and parallelly, and in the open configuration of the connection mechanism, the upper end of each strut means is disposed towards a lower end of the respective track means, and the first and second frame means extend parallelly but spaced apart.

In a preferred embodiment, the biasing element comprises tension spring means further extended in the closed configuration than in the open configuration of the connection mechanism.

Advantageously, the tension spring means extends either between the upper end of the first or second strut means and the lower end of the second or first strut means respectively, or between said upper end of the first or second strut means and a fixed point on the second or first frame means respectively.

Preferably, the connection mechanism comprises two said scissor mechanisms.

Advantageously, said two scissor mechanisms are disposed adjacent respective horizontally-remote edges of the apparatus.

Preferably, the connection mechanism is provided with a single damping element, associated with the or one of the two scissor mechanisms.

In a preferred embodiment, the damping element comprises a first hollow element and a second element profiled so as to fit moveably within a recess of the hollow element Advantageously, the damping element comprises a hollow cylindrical element and a cylindrical rod element moveable co-axially within a lumen of the hollow cylindrical element.

The damper element comprises an elongate hollow cylindrical element and an elongate cylindrical rod element travelling co-axially within the hollow cylindrical element.

Preferably, the cylindrical rod element forms a close fit, optionally an interference fit, within the hollow cylindrical element.

Motion of the cylindrical rod element within the hollow cylindrical element may be governed by friction between the respective elements.

Motion of the cylindrical rod element within the hollow cylindrical element may be governed by air compressed within the hollow cylindrical element by inwards motion of the cylindrical rod element, and/or by air rarefied within the hollow cylindrical element by outwards motion of the cylindrical rod element.

Motion of the cylindrical rod element within the hollow cylindrical element may be governed by passage of displaced air through a narrow clearance between the cylindrical rod element and the hollow cylindrical element.

In a preferred embodiment, the apparatus comprises releasable catch means adapted to retain the first and second frame means in contact or extending adjacently, each to the other.

Advantageously, said catch means comprises a plurality of latch means, each extending between the first and second frame means.

Advantageously, said latch means are controllably disengageable by urging the first and second frames towards one another.

Advantageously, said latch means engage automatically when disengaged first and second frame means are brought together and respective latch portions associated with the respective frame means come into contact.

The apparatus will thus lock in an aligned configuration when the flat video screen is urged into alignment with each other flat video screen of the video wall, but will release when subsequently displaced inwardly of said alignment.

In a second aspect of the present invention, there is provided apparatus or mounting a flat video screen within a recess in a wall or other generally planar support, with a frontal viewing surface of said flat video screen extending flush with an adjacent surface of the wall or other planar support, said apparatus comprising first frame means mountable to a rear surface of the flat video screen opposite its frontal viewing surface, second frame means mountable to said wall or other support within said recess, and an extensible connection mechanism linking said first and second frame means, said connection mechanism being reconfigurable between a closed configuration in which the frontal viewing surface extends flush with the adjacent surface of the wall or other support, and an open configuration in which the flat video screen is displaced significantly outwardly from the wall or other support, wherein:

the connection mechanism comprises one or more scissor mechanisms, the or each scissor mechanism comprising a first and second strut means, connected pivotably together adjacent a respective mid-point of each said strut means, a lower, in use, end of first strut means being pivotably mounted to the first frame means and a lower, in use, end of the second strut means being pivotably mounted to the second frame means, while an upper, in use, end of the first strut means, remote from its lower, in use, end, is constrained to follow substantially vertical track means of the second frame means, and an upper, in use, end of the second strut means is constrained to follow substantially vertical track means of the first frame means, wherein:

a biasing element is provided to urge said connection mechanism towards its open configuration, and wherein:

the connecting mechanism comprises a damping element associated with at least one of the or each scissor mechanism, said damper element extending between the upper end of the first or second strut means and either the lower end of the second or first strut means respectively, or between the upper end of the first or second strut means and a fixed point on the second or first frame means respectively.

An embodiment of the present invention will now be more particularly described by way of example and with reference to the Figures of the accompanying drawings, in which:

FIGS. 5A and 5B are right side elevations of the flat video screen mounting of FIG. 1, in closed and open configurations, respectively;

FIGS. 6A and 6B are plan views from above of the flat screen video mounting of FIG. 1, in closed and open configurations respectively;

FIG. 7 is a frontal isometric view of the flat screen video mounting of FIG. 1, viewed at an angle to reveal its driving and damping mechanisms, shown in a partially disconnected configuration for clarity;

Figure 1:
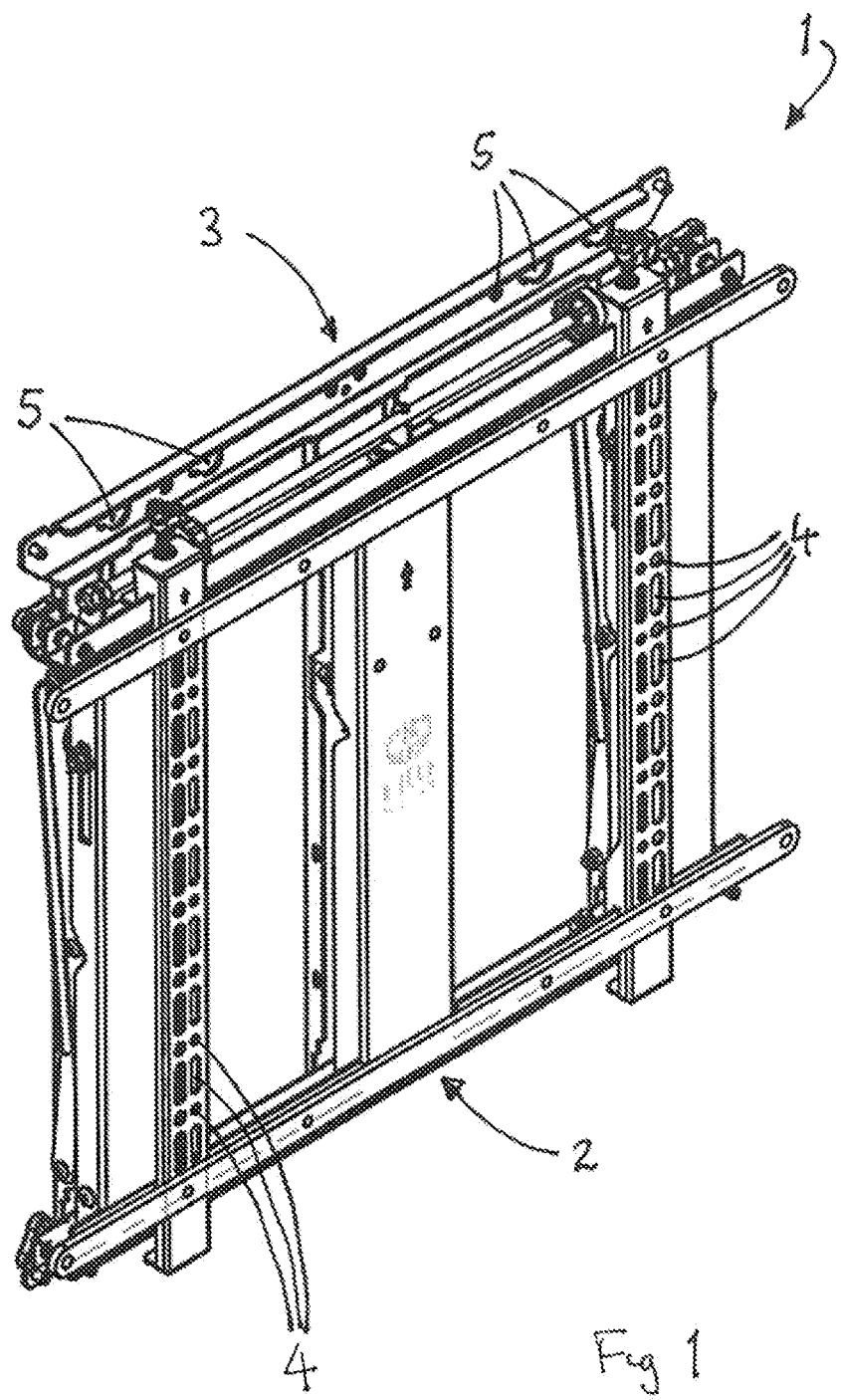
FIG. 1 is an isometric view of a flat video screen mounting of the present invention, in a closed configuration.
Figure 2:
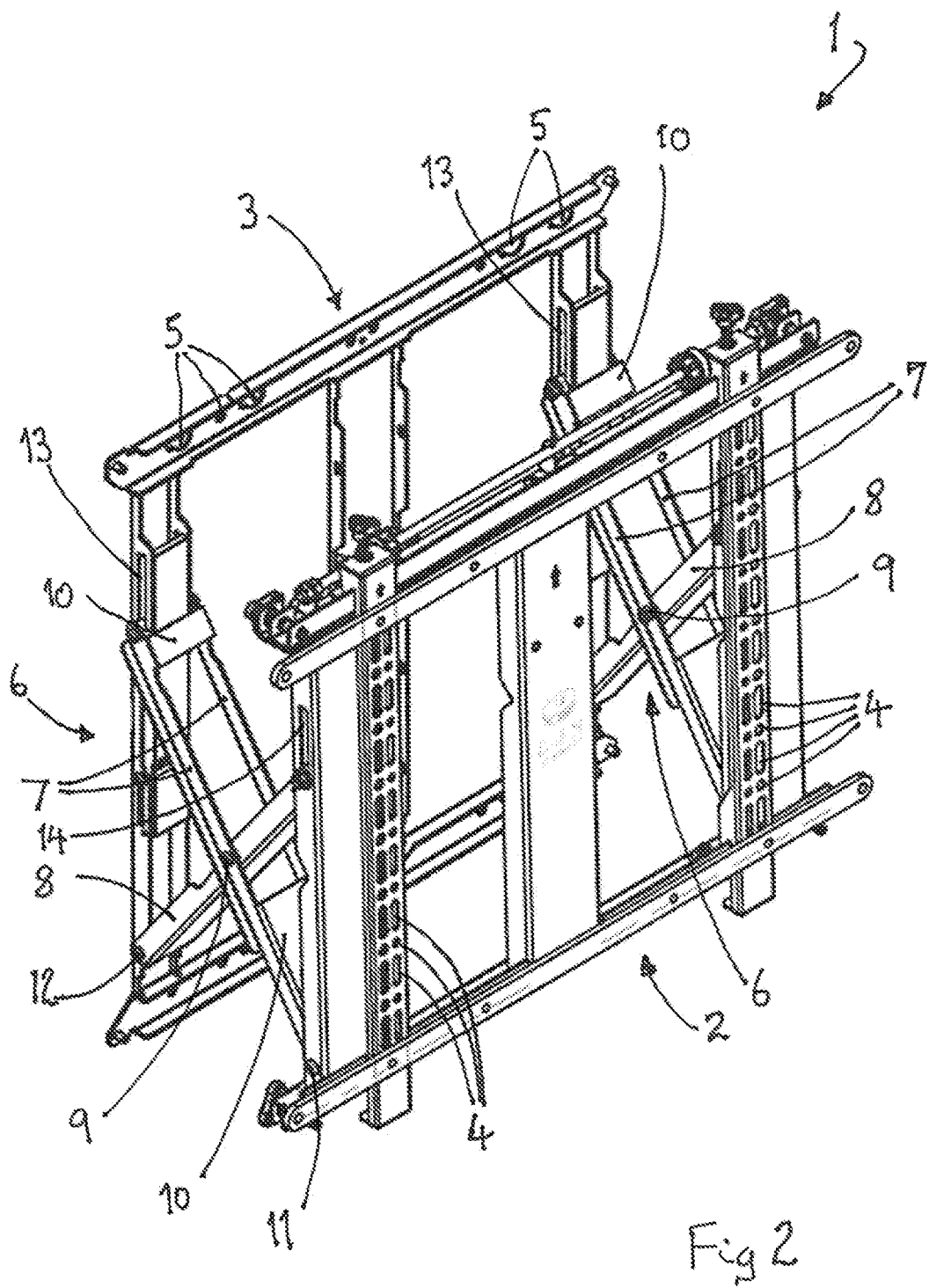
FIG. 2 is an isometric view of the flat video screen mounting of FIG. 1, in an open configuration.

Referring now to the Figures and to FIGS. 1 and 2 in particular, a mounting apparatus 1 embodying the present invention is shown in a closed and an open configuration, respectively.

In the closed configuration, it can be seen that the mounting apparatus 1 comprises a generally-rectangular first or frontal frame element 2 and a generally-rectangular second or rear frame element 3, each having a conventional structure made up of a plurality of metal struts, strips and channels.

The frontal frame element 2 is provided with a plurality of apertures 4, arranged so that any standard flat video screen can be mounted to the frontal frame element 2 using conventional fixing elements and an appropriate selection of the apertures 4.

Similarly, the rear frame element 3 is provided with a plurality of apertures 5, arranged so that the rear frame element 3 may be mounted to a support surface, again using conventional fixing elements selected appropriately to the particular support structure or wall.

In the open configuration, as shown in FIG. 2, not only can the frontal 2 and rear 3 frame elements be more clearly distinguished, but a mechanism linking the frame elements 2, 3 is now visible (Note: there are further elements of the structure of the mounting apparatus 1 that are still not visible in FIG. 2, and will be described in the context of FIGS. 7 to 9, below).

This mechanism here comprises two scissor mechanisms 6, located adjacent respective horizontally opposite edges of each frame element 2, 3. Each scissor mechanism 6 in this example comprises three elongate strut elements, two narrower first strut elements 7 being disposed to either side of a broader second strut element 8.

The three strut elements 7, 8, 7 are pivotably joined together adjacent their respective midpoints, by a pivot pin 9. The first strut elements 7 extend parallel to each other and are linked adjacent their respective upper and lower ends by respective transverse plates 10.

Each first strut element 7 is pivotably mounted adjacent its lower, in use end to the frontal frame element 2, by means of a first pivot axle 11.

Similarly, the second strut element 8 is pivotably mounted adjacent its lower, in use end to the rear frame element 3, by means of a second pivot axle 12.

The first strut elements 7 are each engaged adjacent their respective upper ends with a respective elongate vertical slot 13 formed in the rear frame element 3, while the second strut element 8 is engaged its upper end with a respective elongate vertical slot 14 formed in the frontal frame element 2. In each case, the respective upper end of the strut element 7, 8, 7 is constrained to travel up and down along the respective slot 13, 14.

Thus, as can be seen more clearly in FIGS. 5A and 5B, in the closed configuration of FIGS. 1 and 5A, the strut elements 7, 8, 7 of the scissor mechanisms 6 are all aligned almost vertically in between the now-adjacent frontal 2 and rear 3 frame elements. The upper end of the second strut element 8 is located adjacent the upper end of the vertical slot 14, and the upper end of the first strut element 7 is located adjacent the upper end of the vertical slot 13 (although in the view of FIG. 5A it is hidden behind the first strut element 7 itself).

In the open configuration of FIGS. 2 and 5B, however, the strut elements 7, 8, 7 extend diagonally, spacing the frontal 2 and rear 3 frame elements well apart. The upper end of the second strut element 8 is now located at the lower end of the vertical slot 14 and the upper end of the first strut element is located at the lower end of the vertical slot 13.

Given the pivotal connection of the respective lower ends of the strut elements 7, 8, 7 to the frame elements 2, 3 by the respective pivot axles 11, 12, and the pivotal connection together of the strut elements 7, 8, 7 adjacent their respective mid-points by the pivot pin 9, opening and closing of the scissor mechanism 6 takes place with a plane of the frontal frame element 2 remaining parallel to a plane of the rear frame element 3 throughout.

Figure 3:
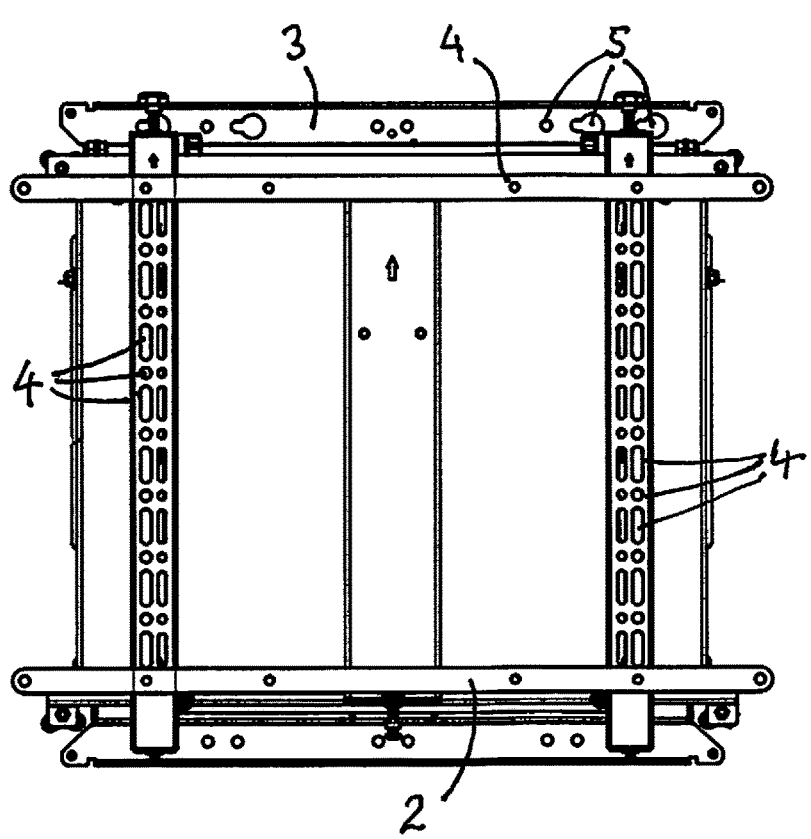
FIG. 3 is a frontal elevation of the flat video screen mounting of FIG. 1.
Figure 4:
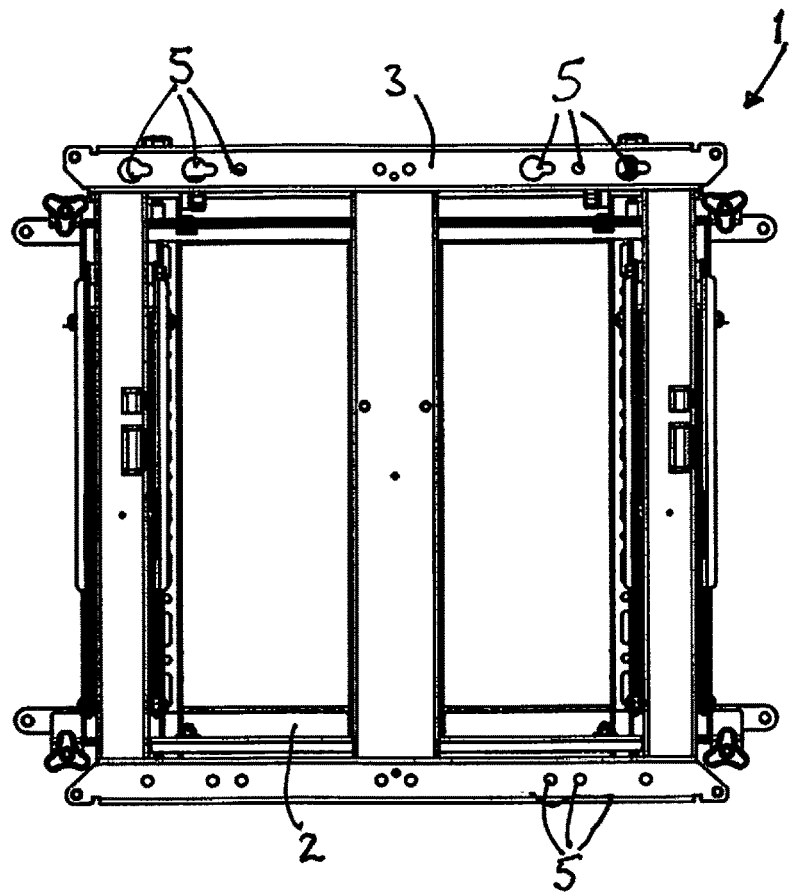
FIG. 4 is a rear elevation of the flat video screen mounting of FIG. 1.

FIGS. 3 and 4 show a frontal and rear view of the mounting apparatus 1, respectively. The locations of the respective apertures 4, 5 in the frontal and rear frame elements 2, 3 may be more clearly distinguished in these views.

FIGS. 6A and 6B, showing the mounting apparatus 1 from above, again show how the frontal 2 and rear 3 frame elements are held closely adjacent in the closed configuration and spaced apart in the open configuration, maintained in position by the scissor mechanism 6.

FIG. 6B also shows a first latch element 15, part of a latch mechanism to selectably hold the mounting apparatus 1 in the closed configuration. The first latch element 15 is located on a face of the rear frame element 3 oriented towards the front frame element 2. Conversely, a second latch element 16 is located on a face of the frontal frame element 2 oriented towards the rear frame element 3, such that the latch elements 15, 16 will meet in the closed configuration of the mounting apparatus 1. (Portions of the second latch element 16 are just visible in FIG. 6B, in between the structural elements of the frontal frame element 2).

Figure 8:
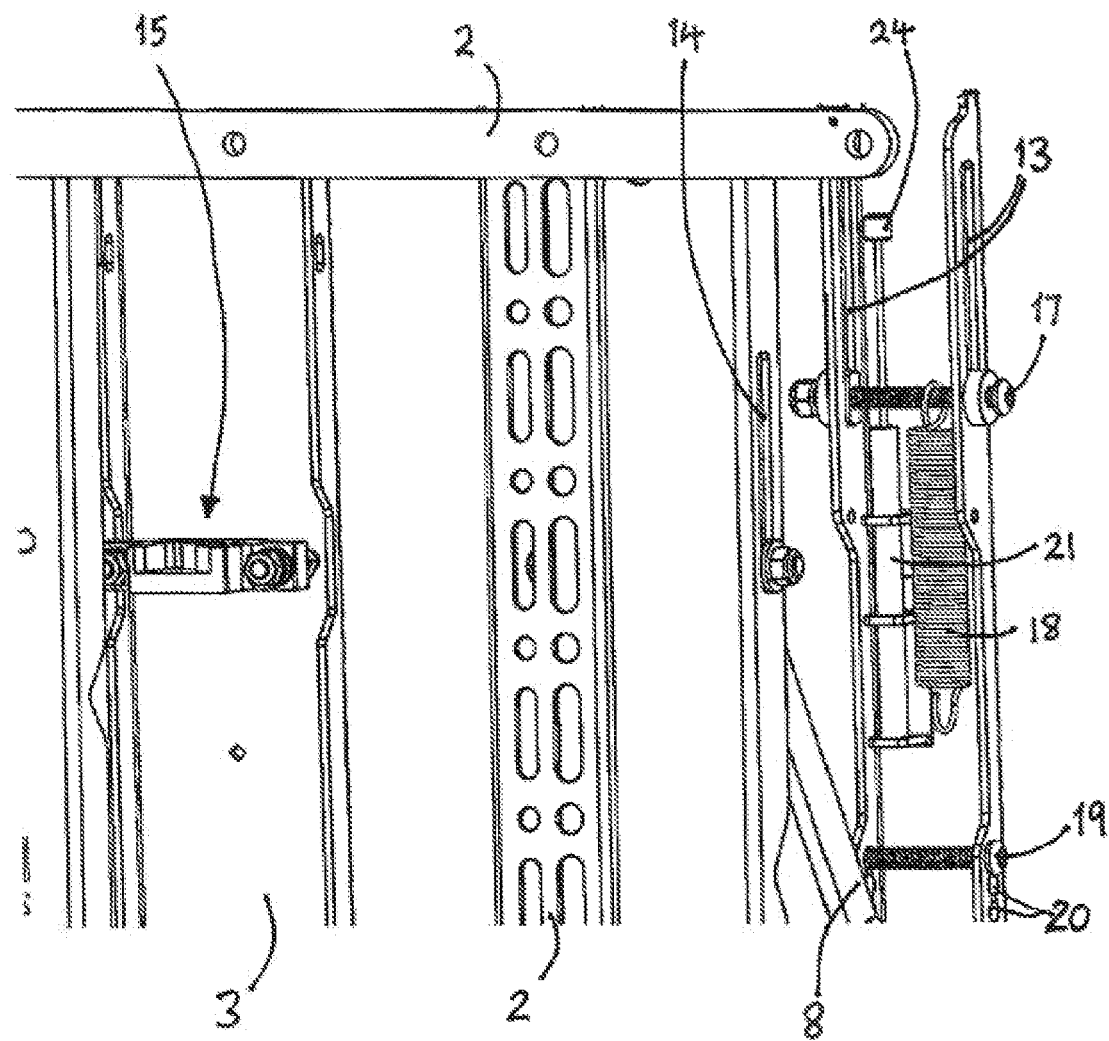
FIG. 8 is a scrap isometric view of the flat screen video monitor of FIG. 7, showing the partially disconnected driving and damping mechanisms in more detail.

Turning now to FIGS. 7 and 8 (FIG. 8 being an expanded view of part of FIG. 7), from a viewpoint of slightly above and to the right of the mounting apparatus, further details of their mechanism can be seen, including those most characteristic of this embodiment of the invention. (NB some components have been removed or partially disassembled in these Figures, so as to display these particular details more clearly).

The mounting apparatus 1 is shown in an open configuration, and on the left of FIG. 7, one of the scissor mechanisms 6 is visible. The second strut element 8 is visible, pivotably mounted to the rear frame element 3 by means of the second pivot axle 12, extending at an angle to the vertical, and meeting one of the first strut elements 7 where they are pivotably connected together by pivot pin 9. An upper end of the second strut element 8 is hidden behind part of the frontal frame element 2.

One of the first strut elements 7 is also visible, extending at a downwards angle from where its upper end is engaged with the elongate vertical slot 13 (since this is the open configuration, the first strut element 7 is at the lower end of the slot 13). The other first strut element 7 is hidden by parts of the frontal frame element 2, but the transverse plate 10, extending between the respective upper ends of the two first strut elements 7, is visible.

Also in FIG. 7, the first latch element 15 can again be seen, located roughly centrally on the face of the rear frame element 3 oriented towards the frontal fame element.

On the right of FIG. 7 and in FIG. 8, the second strut element 8 of the respective scissor mechanism 6 is visible, extending upwards at an angle from the second pivot axle 12, but the two first strut elements 7 have been omitted, the better to show further details.

A threaded pin or rod 17 extends horizontally through the two vertical slots 13 of this scissor mechanism 6. Each of the first strut elements 7 would be pivotably mounted to the threaded pin 17, outboard of the vertical slots 13 and adjacent an end of the threaded pin 17.

Motion of the scissor mechanism 6 of this embodiment is driven by a tension spring 18. The tension spring 18 is shown in FIGS. 7 and 8 as hanging from a central position of the threaded pin 17. However, in use, a lower end of the tension spring 18 would be hooked around a lower threaded pin rod 19, which extends parallel of the first threaded pin 17, but is fastened to the rear frame element 3. A series of apertures 20 provide alternative locations to receive the lower threaded pin 19, further away from the threaded pin 17.

When the tension spring 18 is connected at one end to the threaded pin 17 and at the other end to the lower threaded pin 19, it will clearly be in tension, urging the threaded pins 17, 19 to move towards each other. While the mounting apparatus 1 and scissor mechanism 6 are in the open configuration as shown, the threaded pin 17 is at the lower end of the elongate vertical slots 13, minimising the tension in the spring 18, but in the closed configuration the threaded pin 17 (and the upper ends of the first strut elements 7 connected thereto) will be adjacent the upper end of the vertical slot 13, thus extending the spring 18 and putting it under greater tension. If the lower threaded pin 19 is positioned in one of the other apertures 20, the extension of the spring 18 and so the tension will be that much greater Thus, the tension spring 18 urges the threaded pin 17 (and hence the upper ends of the first strut elements 7) downwardly, biasing the scissor mechanism 6 (and so the mounting apparatus 1 as a whole) towards the open configuration. As a result, when, in the closed configuration, the frontal and rear frame elements 2, 3 are unlatched from each other (see below for details), the mounting apparatus 1 is automatically moved towards the open configuration.

However, there is a risk that this may happen too rapidly or forcibly, risking damage to the mounting apparatus 1, to the fixing elements holding it to the wall or other support, to a flat video screen mounted thereto, or to the fixing elements between he mounting apparatus 1 and the flat video screen. Over-energetic or sudden movement could even cause even injury to an operator who has just unlatched the mounting apparatus 1. Using a weaker tension spring 18 to lower the forces imposed has been found not to be satisfactory.

The scissor mechanism is therefore also fitted with a motion damping unit 21. (NB: in FIGS. 7 and 8, this is also shown not fully engaged for clarity).

Figure 9:
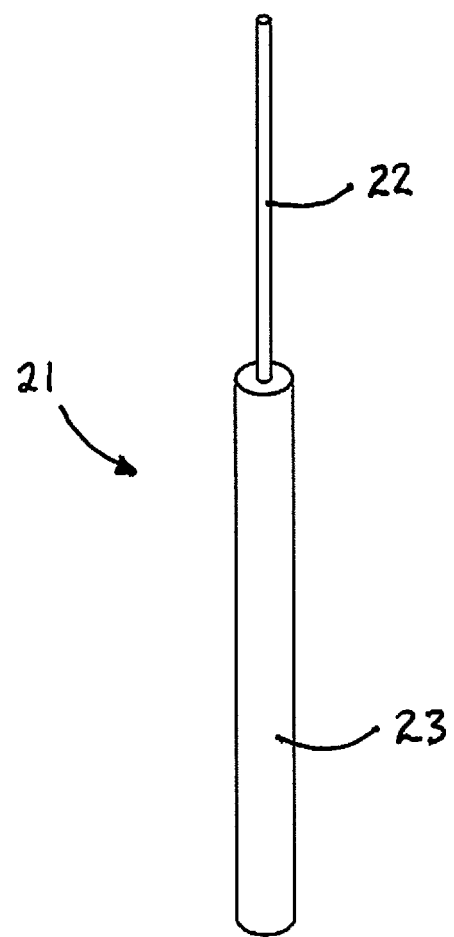
FIG. 9 is an isometric view of the damping mechanism isolated from the flat screen video mounting of FIG. 7.

The basic structure of the motion damping unit 21 is shown in FIG. 9. An elongate straight cylindrical rod 22 is received coaxially into a cylindrical lumen of a hollow cylindrical body 23, the rod 22 being a close fit within the lumen. Thus, if the rod 22 is moved further into the lumen of the cylindrical body 23, this motion will be opposed, partially by friction and partially by compression of air trapped within the lumen by the rod 22, creating a force urging the rod 22 outwardly. If the rod 22 permits escape of any of the compressed air from the lumen, this will have to pass through the very small clearances between the rod 22 and the lumen; again, inwards/downwardly motion of the rod 22 is opposed.

As shown in FIG. 8, the cylindrical body 23 of the motion damping unit 21 is fastened to the rear frame element 3, near the tension spring 18. In the particular example shown in FIG. 8, a cap 24 is provided on an upper end of the rod 22, remote from the cylindrical body 23. When the tension spring 18 is connected up, the scissor mechanism 6 is in the closed configuration and the threaded pin 17 is located at the upper end of the vertical slots 13, this cap 24 will fit just beneath the threaded pin 17. Thus, when the tension spring 18 is allowed to pull the threaded pin 17 (and hence the connected upper ends of the first strut element 7) downwardly, this would urge the rod 22 into the lumen of the cylindrical body 23.

The motion damping unit 21 thus opposes the downwards motion of the threaded pin 17 and the upper ends of the first strut elements 7, and hence the motion of the scissors mechanism 6 and the mounting apparatus 1 as a whole from the closed to the open configuration, making this motion far smoother and more controlled. With the right balance of the tension spring 18 and the motion damping unit 21, the movement of the mounting apparatus 1 into the open configuration can be adjusted to a desired rate, avoiding jerks and impacts and potential damage as described above.

Figure 10:
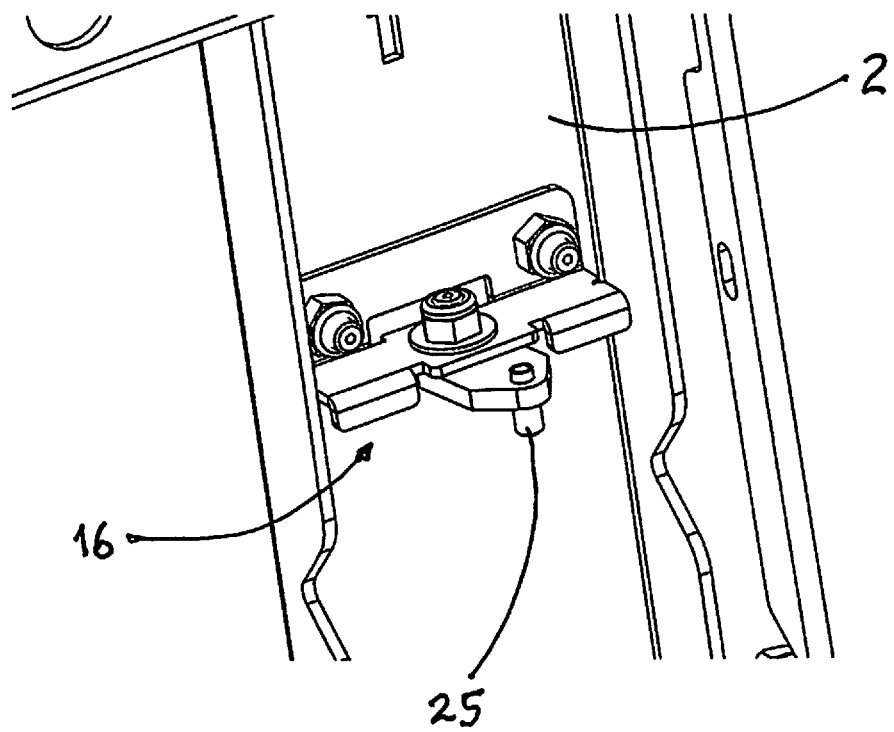
FIGS. 10A and 10B are scrap isometric views showing two interlockable components of a catch mechanism of the flat screen video mounting of FIG. 1.
Figure 10:
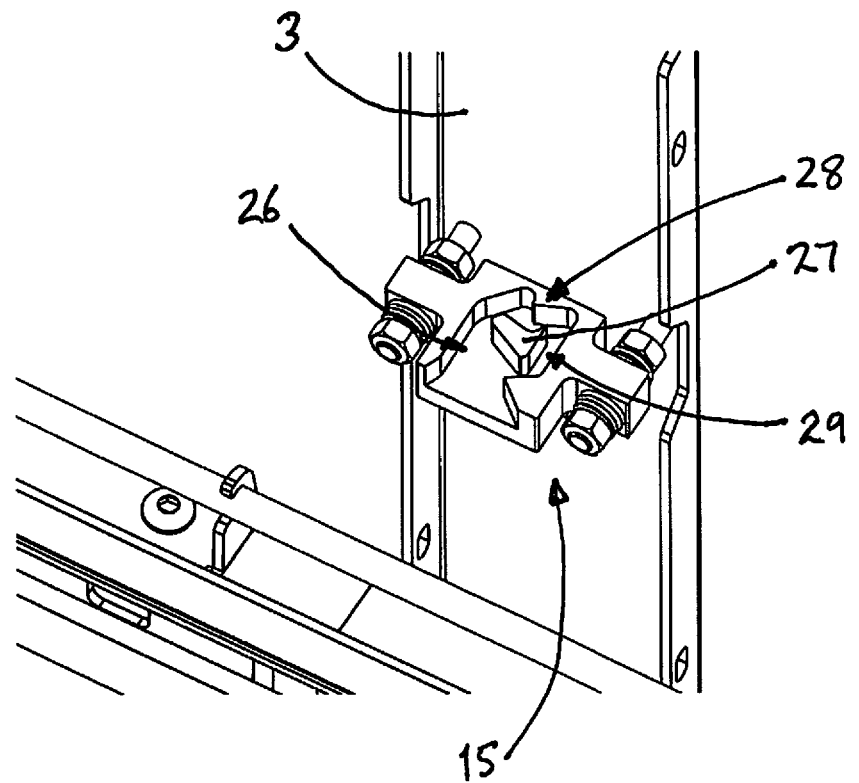

FIGS. 10A and 10B show the first and second latch elements 15, 16 in more detail. The second latch element 16, located on the frontal frame element 2, comprises an outward projection with a guide pin 25 extending downwardly, in use, from adjacent its tip. The first latch element 15, located on the rear frame element 3, comprises a horizontal, in use, flat plate with a series of guide tracks 26, 28, 29 formed in its upper surface. The latch elements 15, 16 are so aligned that when the frontal 2 and rear 3 frame elements approach, entering the closed configuration of the mounting apparatus 1, the guide pin 25 of the second latch element 16 enters and follows the guide tracks 26, 28, 29 of the first latch element 15.

The guide pin 25 first enters a broad entry track 26. The entry track 26 narrows inwardly, and the guide pin 25 contacts a first angled face of a guide body 27 defined between the guide tracks 26, 28, 29. This steers the guide pin 25 around the guide body 27 to an inner end of the entry track 26, where it meets an engagement track 28 extending generally transversely on an inward side of the guide body 27. As the frame elements 2, 3 and hence the latch elements 15, 16 are urged together, the guide pin 25 is steered into a first recess on an inward face of the engagement track 28.

When a user then stops urging the frame elements 2, 3 together, the bias produced by the tension spring 18 now urges the frame element 2, 3 and the latch elements 15, 16 back apart, and the guide pin 25 moves outwardly. However, due to the profile of the engagement track 28, this leads to the guide pin 25 contacting a second angled face on a reverse of the guide body 27, preventing it from travelling outwardly and instead steering it into a holding recess on an inwards face of the guide body 27, in which it is retained. Thus, the latch elements 15, 16 and the frame elements 2, 3 are locked together in the closed configuration.

To open this latch mechanism, the user again urges the frame elements 2, 3 together. The guide pin 25 thus moves inwardly from the holding recess in the guide body 27 in which it was held. Due to the location of the holding recess along the guiding body 27, however, this moves the guide pin 25 into a second recess in the inward face of the engagement track 28, separated laterally from the first. This second recess is so located that, when the user stops urging the frame elements 2, 3 together, and the tension spring 18 can again urge them away from each other, the guide pin 25 is now aligned with a release track 29 leading back around the guide body 27, rather than returning to the holding recess therein. The release track 29 steers the guide pin 25 outwardly to a point at which the release track 29 joins the entry track 26 adjacent its mouth, and the guide pin 25 is no longer constrained by the guide tracks 26, 28, 29. The latch mechanism is thus released, and the mounting apparatus 1 is free, under the bias provided by the tension spring 18, moderated by the controlling effect of the motion damping unit 21, to move into the open configuration.

Thus, a user may simply open a "closed" mounting apparatus 1 with a brief pressure on the frontal frame element 2 (or the flat video screen mounted thereto), releasing the latch mechanism, after which the mounting apparatus will smoothly open out, allowing access to a rear of the flat video screen, so that it can be removed for repair or replacement. The mounting apparatus 1 may then simply be re-closed by urging it closed against its bias to open, until the latch mechanism re-engages, and the mounting apparatus 1 will then stay "closed" until the latch mechanism is operated again.

This arrangement works equally well when the mounting apparatus 1 is holding a flat video screen within a video wall array, or when it is holding a flat video screen within a recess in a structure. The mounting apparatus 1 is relatively straightforward in construction, making it economical and reliable, and should obviate the drawbacks of existing systems, such as excessively sudden, rapid and uncontrolled movements that might risk damage and injury.

The invention claimed is:

1. Apparatus for mounting a flat video screen to a support as part of a video wall, in which a frontal viewing surface of said flat video screen extends flush with a frontal viewing surface of each other flat video screen of the video wall,
    said apparatus comprising first frame means mountable to a rear surface of the flat video screen opposite its frontal viewing surface, second frame means mountable to a wall or other support, and a selectably extensible connection mechanism linking said first and second frame means,
    said connection mechanism being selectably reconfigurable between:
    a closed configuration in which the frontal viewing surface extends substantially coplanarly with the frontal viewing surfaces of adjacent flat video screens of the video wall, and:
    an open configuration in which said flat video screen is displaced significantly outwardly from the video wall,
    wherein the connection mechanism comprises one or more scissor mechanisms, with
    the or each scissor mechanism comprising a first and second strut means, connected pivotably together adjacent a respective mid-point of each said strut means,
    a lower, in use, end of first strut means being pivotably mounted to the first frame means and a lower, in use, end of the second strut means being pivotably mounted to the second frame means, and
    an upper, in use, end of the first strut means, remote from said lower, in use, end, is constrained to follow substantially vertical elongate track means of the second frame means, and an upper, in use, end of the second strut means is constrained to follow substantially vertical elongate track means of the first frame means;
    wherein a biasing element is provided to urge said connection mechanism towards its open configuration;
    and wherein the connection mechanism is provided with a damping element associated with at least one of the or each scissor mechanism,
    said damping element being operatively connected either between the upper end of the first or second strut means and the lower end of the second or first strut means respectively, or between said upper end of the first or second strut means and a fixed point on the second or first frame means respectively.

2. Apparatus for mounting a flat video screen to a support as claimed in claim 1, wherein:
    in said closed configuration of the connection mechanism, the upper end of each strut means is disposed adjacent an upper end of a respective track means, and the first and second frame means extend parallel to and adjacent each other, and:
    in said open configuration of the connection mechanism, the upper end of each strut means is disposed towards a lower end of the respective track means, and the first and second frame means extend parallelly but spaced apart.

3. Apparatus for mounting a flat video screen to a support as claimed in claim 1, wherein the biasing element comprises tension spring means, extended farther in the closed configuration of the connection mechanism than in the open configuration thereof.

4. Apparatus for mounting a flat video screen to a support as claimed in claim 3, wherein the tension spring means extends either between the upper end of the first or second strut means and the lower end of the second or first strut means respectively, or between said upper end of the first or second strut means and a fixed point on the second or first frame means respectively.

5. Apparatus for mounting a flat video screen to a support as claimed in claim 1, wherein the connection mechanism comprises two said scissor mechanisms.

6. Apparatus for mounting a flat video screen to a support as claimed in claim 5, wherein said two scissor mechanisms are disposed adjacent respective horizontally-remote edges of the apparatus.

7. Apparatus for mounting a flat video screen to a support as claimed in claim 1, wherein the connection mechanism is provided with a single damping element, associated with the or one of the two scissor mechanisms.

8. Apparatus for mounting a flat video screen to a support as claimed in claim 1, wherein the damping element comprises a first hollow element having an open-ended recess and a second element so profiled as to fit moveably within said open-ended recess.

9. Apparatus for mounting a flat video screen to a support as claimed in claim 8, wherein the damping element comprises a hollow cylindrical element and a cylindrical rod element moveable co-axially within a lumen of the hollow cylindrical element.

10. Apparatus for mounting a flat video screen to a support as claimed in claim 9, wherein the damper element comprises an elongate hollow cylindrical element and an elongate cylindrical rod element travelling co-axially within the hollow cylindrical element.

11. Apparatus for mounting a flat video screen to a support as claimed in claim 10, wherein the cylindrical rod element forms a close fit, optionally an interference fit, within the hollow cylindrical element.

12. Apparatus for mounting a flat video screen to a support as claimed in either claim 10, wherein motion of the cylindrical rod element within the hollow cylindrical element is governed by friction between the respective elements.

13. Apparatus for mounting a flat video screen to a support as claimed in claim 10, wherein motion of the cylindrical rod element within the hollow cylindrical element is governed by air compressed within the hollow cylindrical element by inwards motion of the cylindrical rod element, and/or by air rarefied within the hollow cylindrical element by outwards motion of the cylindrical rod element.

14. Apparatus for mounting a flat video screen to a support as claimed in claim 10, wherein motion of the cylindrical rod element within the hollow cylindrical element is governed by passage of displaced air through a narrow clearance between the cylindrical rod element and the hollow cylindrical element.

15. Apparatus for mounting a flat video screen to a support as claimed in claim 1, comprising releasable catch means adapted to retain the first and second frame means extending in contact or adjacent to each other.

16. Apparatus for mounting a flat video screen to a support as claimed in claim 15, wherein said releasable catch means comprises a plurality of separate latch means, each extending between the first and second frame means.

17. Apparatus for mounting a flat video screen to a support as claimed in claim 16, wherein said latch means are each controllably disengageable by urging the first and second frames towards one another.

18. Apparatus for mounting a flat video screen to a support as claimed in claim 16, wherein said latch means engage automatically when the first and second frame means are brought together such that respective latch portions associated with the respective frame means come into contact.

19. Apparatus for mounting a flat video screen to a support as claimed in claim 1, which locks in an aligned configuration when the flat video screen is urged into alignment with each other flat video screen of the video wall, but releases when subsequently displaced inwardly of said alignment.

20. Apparatus for mounting a flat video screen within a recess in a wall or other generally planar support, with a frontal viewing surface of said flat video screen extending flush with an adjacent surface of said wall or other planar support, said apparatus comprising first frame means mountable to a rear surface of the flat video screen opposite its frontal viewing surface, second frame means mountable to said wall or other support within said recess, and an extensible connection mechanism linking said first and second frame means, said connection mechanism being reconfigurable between a closed configuration in which the frontal viewing surface extends flush with the adjacent surface of the wall or other support, and an open configuration in which the flat video screen is displaced significantly outwardly from the wall or other support, wherein:

the connection mechanism comprises one or more scissor mechanisms, the or each scissor mechanism comprising a first and second strut means, connected pivotably together adjacent a respective mid-point of each said strut means, a lower, in use, end of first strut means being pivotably mounted to the first frame means and a lower, in use, end of the second strut means being pivotably mounted to the second frame means, while an upper, in use, end of the first strut means, remote from its lower, in use, end, is constrained to follow substantially vertical track means of the second frame means, and an upper, in use, end of the second strut means is constrained to follow substantially vertical track means of the first frame means, wherein:

a biasing element is provided to urge said connection mechanism towards its open configuration, and wherein:

the connecting mechanism comprises a damping element associated with at least one of the or each scissor mechanism, said damper element extending between the upper end of the first or second strut means and either the lower end of the second or first strut means respectively, or between the upper end of the first or second strut means and a fixed point on the second or first frame means respectively.

* * * * *